H. E. HULL.
BORING TOOL HOLDER.
APPLICATION FILED MAR. 8, 1909.
984,000.
Patented Feb. 14, 1911.
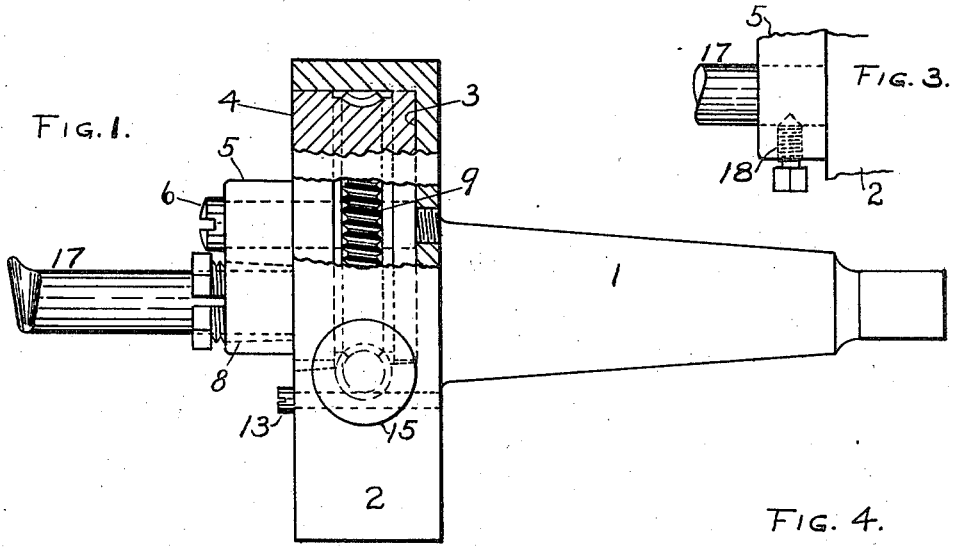
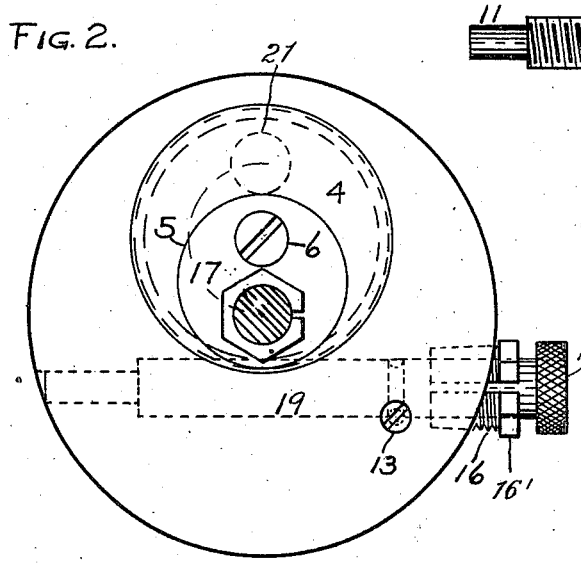
WITNESSES;
INVENTOR
BY
ATTORNEY

UNITED STATES PATENT OFFICE.

HORACE E. HULL, OF LANSING, MICHIGAN, ASSIGNOR TO ALBERT V. MOON, OF LANSING, MICHIGAN.

BORING-TOOL HOLDER.

984,000.

Specification of Letters Patent.  Patented Feb. 14, 1911.

Application filed March 8, 1909.  Serial No. 482,116.

*To all whom it may concern:*

Be it known that I, HORACE E. HULL, a citizen of the United States, residing at Lansing, in the county of Ingham and State of Michigan, have invented certain new and useful Improvements in Boring-Tool Holders, of which the following is a specification.

My invention relates to boring tool holders, and its purpose is to make a device in which the tool shall be readily and exactly adjusted to any required radius within the limits of construction, and in which at the same time the tool shall be rigidly held in any desired position. I attain these purposes by the mechanism shown in the accompanying drawings, in which—

Figure 1 is an elevation of my device taken from the side, partly in section and with part of the head broken away to show the worm wheel; Fig. 2 is an elevation looking on a line parallel with the driving shaft of the lathe, or boring machine. Figs. 3, 4, 5, and 6 are views of various details of the construction, the exact purpose of which will more fully appear further on.

In the drawings, 1, represents the shank of the tool holder, which is of the usual form, being constructed to the standard taper used in all devices of that description, and therefore requires no particular description. A head, 2, is integrally formed on the outer end of this shank, and a recess, 3, eccentrically positioned with regard to the center of the head, 2, is formed in the head, 2, in which the tool holder proper, 4, is inserted so as to make a close bearing fit. A boss, or projection, 5, is eccentrically formed on the front face of the tool holder, 4, to furnish additional support to the tool. The tool holder, 4, is retained in its position by a screw, or bolt, 6, passing through its center and secured in any proper manner to the head, 2, and so arranged that the tool holder, 4, revolves around it in the recess, 3, but with so close a fit as to prevent any lateral movement. An opening, 8, eccentrically placed with regard to the center of the tool holder, 4, is made in the holder, 4, to receive the tool. This opening 8 is preferably so placed that as the holder 4 revolves about its axis 6, the center of the tool mounted in said opening 8 will pass through the center of revolution of the head 2. A worm wheel, 9, is formed on the circumference of the holder, 4, adapted to engage with the worm screw, 10, inserted in an opening, 19, formed in the head, and revolves on bearings, 11 and 12, and is prevented from moving axially by any proper means. I at present prefer a screw, 13, fitting a groove, 14, in the shaft of the worm, 10. The worm, 10, is turned to any required position by any proper means, preferably a milled head, 15, and is secured in that position either by a set screw, or, as I much prefer, by a tapered split bushing, 16, adjusted by a hexagon nut, 17, integrally formed on its outer extremity. It is evident that when this bushing is screwed in, it will press against the shaft, 10, and will lock both the bushing and the screw itself, rigidly in position. The tool, 17, is retained in position in the holder, 4, by a similar tapered bushing, but if desired, a set screw, 18, may be employed, without departing from my invention.

The operation of my device is as follows: Suppose the different parts to be in the position shown in Fig. 2. It is evident that the tool in the opening, 8, in the holder, will be at the mathematical center or axis of revolution of the boring machine, and will, therefore, be adapted to make the beginning of the desired hole, by inserting a drill or other suitable tool. When this opening is completed, a boring tool is inserted in the opening, 8, the bushing, 16, is loosened and the milled head, 15, is turned. This will cause the tool holder, 4, to revolve on the shaft, 6, and will move the center of the boring tool along the dotted line, 20, which will cause it to recede from the center of revolution of the machine until the required distance for the cut desired is obtained. When this is done, the bushing, 16, is tightened and the holder, 4, is rigidly held in position by the worm, 10, until the cut is completed. Under ordinary circumstances, after the bushing, 16, is adjusted to a close bearing fit on the shaft, 12, it will usually be unnecessary to make further adjustment for a long time, as the friction will be sufficient to hold the parts in position for any ordinary work. It is evident that in this manner a tool can be adjusted until it occupies the position indicated by the dotted lines, 21, diametrically opposite to its position at the beginning, and this represents the adjustment for any given head. Of course, it is manifest that by employing different sized heads, any required adjustment can be obtained.

What I claim is:

1. In a boring tool, a rotatable head having an integral shank projecting from one side thereof, and a recess in the other side eccentrically positioned therein, in combination with a tool holder having an eccentrically positioned opening to receive a tool formed in it and revolubly mounted in said recess, means projecting through the head and engaging directly with said tool holder for revolving the same, and a locking member engaging said last mentioned means.

2. In a boring head, a body having an eccentrically positioned recess formed therein, a tool holder having an eccentrically positioned opening to receive a tool formed in it, a bearing passing centrally through the holder and engaging the head whereby the holder is revolubly mounted in said recess and means for revolving said tool holder, said means comprising a worm wheel and a screw.

3. A machine of the character described, a rotatable head having projecting from one surface a shank whereby the head may be rotated, and an eccentric recess in its opposite surface, a tool holder mounted in said recess for rotatable adjustment and having an eccentric boss projecting outwardly therefrom and adapted for the reception of a tool, means for supporting the tool holder on the head comprising a bolt passing through said boss and centrally through the holder for engagement with the head, and which said bolt constitutes an axis or bearing for the holder.

4. In a boring head, a body having an eccentrically positioned recess formed therein, a tool holder having an eccentrically positioned opening to receive a tool formed in it and revolubly mounted in said recess with means for revolving said tool holder, means for locking said tool holder in position, substantially as described.

In testimony whereof, I affix my signature in presence of two witnesses.

HORACE E. HULL.

Witnesses:
H. L. LAWRENCE,
EMMA G. CAVANAGH.